United States Patent
Holst et al.

(10) Patent No.: US 6,671,589 B2
(45) Date of Patent: Dec. 30, 2003

(54) METHOD AND APPARATUS TO SUPPORT REMOTE AND AUTOMATICALLY INITIATED DATA LOADING AND DATA ACQUISITION OF AIRBORNE COMPUTERS USING A WIRELESS SPREAD SPECTRUM AIRCRAFT DATA SERVICES LINK

(76) Inventors: William Holst, 1406 Newport Ct., SE., Renton, WA (US) 98058; David Richard Lee, 15409 SE. 128th St., Renton, WA (US) 98059

( * ) Notice: Subject to any disclaimer, the term of this patent is extended or adjusted under 35 U.S.C. 154(b) by 46 days.

(21) Appl. No.: 10/042,374

(22) Filed: Jan. 4, 2002

(65) Prior Publication Data

US 2002/0111720 A1 Aug. 15, 2002

Related U.S. Application Data

(60) Provisional application No. 60/268,085, filed on Feb. 13, 2001.

(51) Int. Cl.$^7$ .................................................. G06F 7/00
(52) U.S. Cl. ........................................... 701/3; 244/1 R
(58) Field of Search ................................ 701/3, 24, 35, 701/36; 244/1 R

(56) References Cited

U.S. PATENT DOCUMENTS

| | | | |
|---|---|---|---|
| 5,410,478 A | * 4/1995 | Richard et al. | 180/9.1 |
| 6,148,179 A | * 11/2000 | Wright et al. | 340/531 |
| 6,160,998 A | * 12/2000 | Wright et al. | 340/825.72 |
| 6,163,681 A | * 12/2000 | Wright et al. | 340/945 |
| 6,167,238 A | * 12/2000 | Wright | 340/3.3 |
| 6,167,239 A | * 12/2000 | Wright et al. | 340/945 |
| 6,173,159 B1 | * 1/2001 | Wright et al. | 340/3.5 |
| 6,278,396 B1 | * 8/2001 | Tran | 342/29 |
| 6,353,734 B1 | * 3/2002 | Wright et al. | 340/825.72 |

* cited by examiner

Primary Examiner—William A. Cuchlinski, Jr.
Assistant Examiner—Olga Hernandez

(57) ABSTRACT

The system and method of the present invention provides automated electronic switching and control for data uploading of software in the form of operational programs, operational configuration or databases, collection of S/W configuration information from the various loadable avionics (but not limited to avionics) subsystems and download data between those subsystems and the ARINC 615-3 or 615A data load applications. The data load applications can be resident in existing ARINC 615 Airborne, Portable or PC-based data loaders or an optional ARINC 763 type on-aircraft Network Server System. The invention's real-time Linux based platform is also capable of hosting any data load application. The switch interface unit can be either manually controlled as a standalone replacement for existing rotary switches installed on Boeing aircraft, or remotely controlled when integrated into an ARINC 763 type Network Server System such as the Aircraft Data Services ink (ADSL). The switch interface unit functions as the aircraft system selector in the Data Load/Configuration system. The invention is line replaceable, and has many advantages over the existing manual rotary switch. The unit's design meets and exceeds the current data load interfacing requirements for avionics equipment.

18 Claims, 4 Drawing Sheets

METHOD AND APPARATUS TO SUPPORT REMOTE AND AUTOMATICALLY INITIATED DATA LOADING AND DATA ACQUISITION OF AIRBORNE COMPUTERS USING A WIRELESS SPREAD SPECTRUM AIRCRAFT DATA SERVICES LINK

RELATED APPLICATION REFERENCES

This application addresses the subject matter captured in the provisional application 60/268,085, filed on Feb. 13, 2001 and converts it into the format required for a non-provisional patent submission. The title has been changed to more accurately describe the overall novelty discussed in the provisional application.

BACKGROUND OF INVENTION

The second generation of digital airplanes appeared in the late 1980s, models such as the 747-400 and MD-11 that used a multitude of digital computers requiring frequent software updates. It became necessary for the aircraft industry to formulate a strategy on how to make an airline's job easier in performing software updates on those newly airplane-loadable computers. Flight Management Computers (FMCs) were initially the first to have periodic software updates performed, and those were done according to the Tape Loading standard (ARINC 603) which called for the use of a portable device with one ARINC 429 output and two inputs. The loading was performed by attaching a cable and portable tape loader to the 32-pin data loader connector located in various locations in the cockpit (depending on aircraft type)—either closets on the 757/767 classic airplanes or side panels on the 737 classics near the co-pilot's station. These were mounted to avoid having the mechanic crawl around in the EE bay every time he was required to perform a software update.

The avionics industry soon realized that portable tape loaders were slow, large and cumbersome and that a new ARINC data loading standard had to developed to accommodate the 3.5" 1.4 Mb floppy disk, which was the most commonly used storage media in the late '80s. The ARINC 615-1 standard was subsequently approved and released around 1987. The 32-pin connector definition in the original ARINC 603 specification almost doubled to 53 for the new ARINC 615-1 loaders. Some airlines were even demanding that these loaders be configured for permanent mounting on primarily long haul aircraft such as the 747-400. The specification quickly migrated to the -2 and -3 versions in an attempt to accommodate some of these requirements. The specification went from two ARINC 429 output busses and four inputs in 615-2 to four outputs and eight inputs in 615-3, in an attempt to anticipate the maximum number of loadable boxes requiring an interface with the 615 loader. In 1990 eight inputs were enough; however at the present time, there are as many as 24 loadable LRUs on a single aircraft model type.

Aircraft manufacturer Boeing soon realized that the ARINC 615-3 specification would fall short in handling more than eight loadable boxes. At Boeing, a production solution was developed specific to each aircraft model type to accommodate the number of loadable systems, which varied greatly at the time from model to model. Boeing was still selling a lot of 737 classics, and many of those models required only FMC updates. Typical data loader interface configurations consisted of Portable Data Loader (PDL) connectors in various locations in the cockpit, 6 position, 12 position, 20 position, 24 position and 20/4 position rotary switches being offered across the fleet. Finally by 1996, Boeing decided to take a common approach across all models except the 777, which does not use the ARINC 615-3 standard for loading, and make a 20/3 position data loader rotary switch interface basic and stable. The discontinuance of the 737 classic line and the offering of the new generation 737s caused the addition of over 12 loadable LRUs, with more on the horizon. Hence, all Boeing aircraft delivered after March of 1998 could justify the use the cross model switch. There are approximately 200 wires (ARINC 429 in/out, loader enable discretes, function discretes) populating 4 circular connectors located on the data loader switch module assembly installed on the P-61 maintenance panel for the 737/757/767 models and the P-11 panel for the 747. All loadable systems on Boeing airplane models (except the 777) interface with the rotary switch.

SUMMARY OF INVENTION

As stated previously, the switch interface unit bridges the gap between interfacing with existing avionics systems for data uploading and data acquisition without drastically modifying the way airplanes are currently built (primarily but not limited to Boeing). It's functionality is easily adaptable so that it can become an integral component on future on-board network systems such as the Aircraft Data Services Link (ADSL). This invention provides marked improvement and capability (when used as the directed data query and download engine to a ARINC 763-type Network Server System such as the ADSL) over the Ground Data Link (GDL) system referenced in U.S. Pat. No. 6,047,165 etc. It allows the ADSL to establish ARINC 615 communication with a multitude of computers, but not limited to the Digital Flight Data Acquisition Unit (DFDAU) and FMC without manual intervention via a selection on the rotary switch—a feature that the GDL does not claim to embody, since that system is specifically a real-time flight performance data capture tool by way of one of the DFDAU's serial ARINC 573 outputs or a hard wired data loader tool paralleled downstream of the existing rotary switch. This invention allows a drastically different approach to the way that previous inventions acquires and wirelessly relays data to/from the aircraft and ground stations.

This invention used in its ADSL application cannot support real-time flight performance data capture, store and transmit, however upon touchdown, an active query of all the previous flight's pre-processed ACMS triggered reports, SAR, QAR and DAR historical data along with any other 615 download data, can be initiated by way of the remotely selectable ARINC 429 data loader interfaces connected to this invention. In reality, no accumulated data is lost, and the ADSL cannot be identified as performing a "non-confidential real time monitoring" task, since by virtue of avionics system interlocks in the air, this invention in its ADSL application cannot direct an active query to a loadable system and obtain a response.

DETAILED DESCRIPTION

Figure 1:
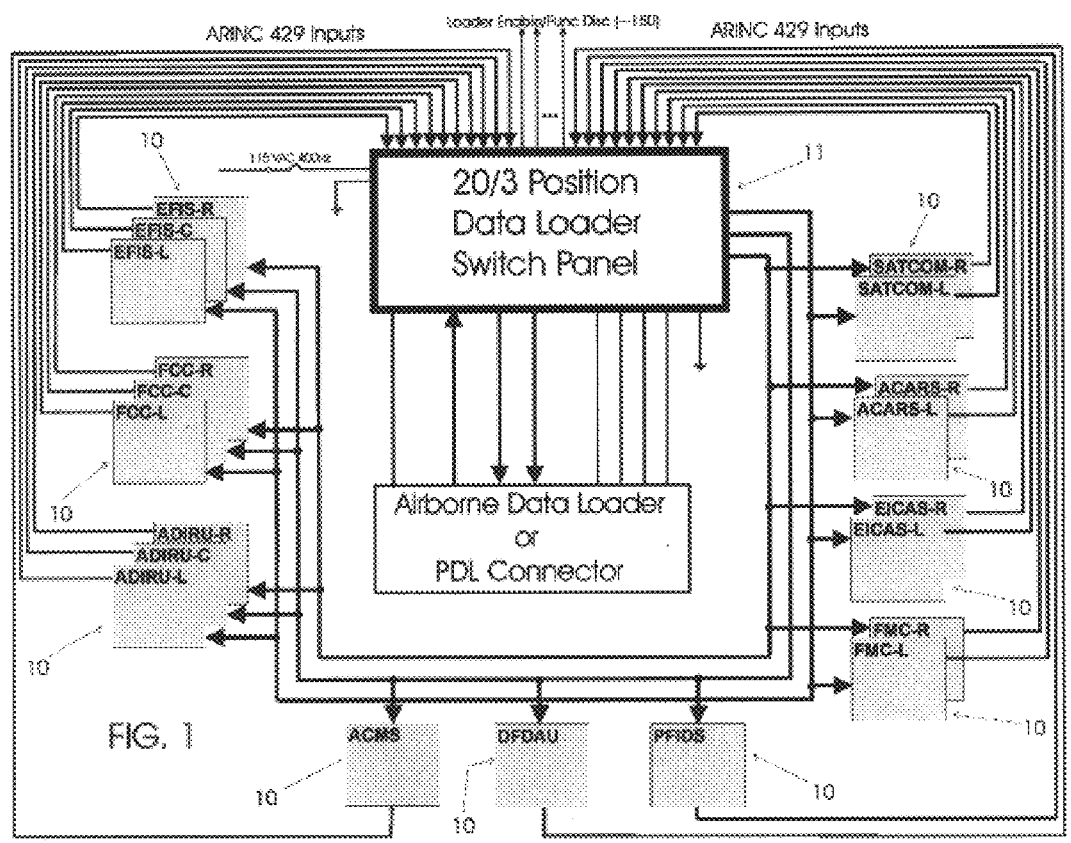
FIG. 1 diagrammatically illustrates the current model used on Boeing airplanes for ARINC 615 communication between (but not limited to) avionics LRUs and the software data loading function which is resident in Airborne or Portable data loaders.
Figure 2:
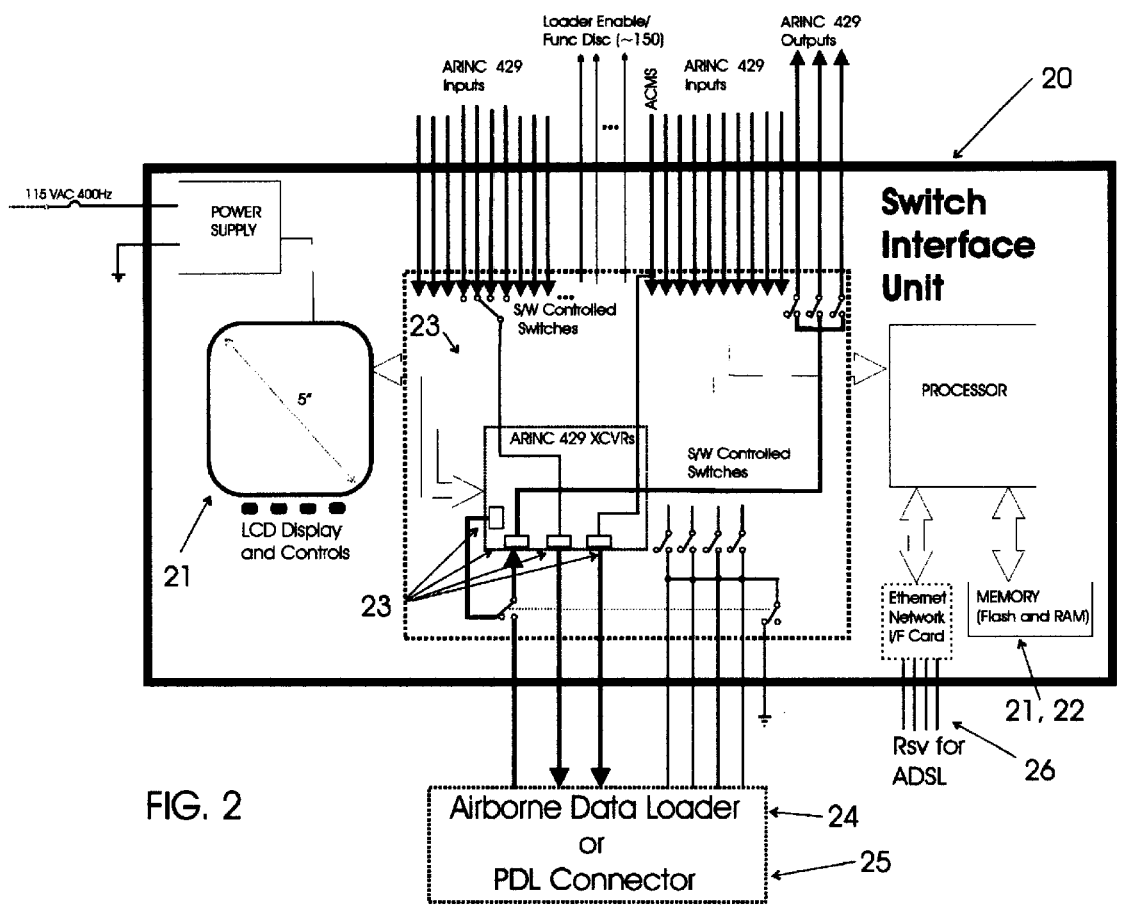
FIG. 2 diagrammatically illustrates a simplified functional schematic of the invention used in its stand-alone application, i.e., as a replacement for the rotary switch currently installed on Boeing aircraft. The design is such that the incorporation of an ARINC 615-3 or ARINC 615A application in the invention will not impact the current aircraft interfaces.

The usefulness of this method and apparatus is manifested in its two distinct and basic configurations—the first being a stand alone replacement for the legacy data loader rotary switch 11 shown in FIG. 1 that functions as:

1) a programmable electronic switch 20 in FIG. 2 which displays and allows selection of loadable systems 10 in FIG. 1 on the aircraft for the purpose of initiating a software data load. The unit's I/O is programmable, primarily to activate interfaces with loadable LRUs connected to the invention, which may vary with airplane model and customer.
2) a configuration data tool, 21 referenced in FIG. 2 i.e., loadable LRUs software part number collection and data display device.
3) storage 22 for such aircraft LRU configuration information as described in 2).
4) a monitor of incoming and outgoing ARINC 429 traffic through the invention, with appropriate connections initiated between communicating end-user systems and a data loader application, whether the application is resident in an existing ARINC 615-3 airborne loader 24, a future ARINC 615A Ethernet loader 20, a portable data loader 25 when connected to the flight deck connector or the invention itself, which is capable of hosting the data loader application on its real time Linux operating system. The preferred embodiment of the ARINC 615 (as a minimum, 615-3) data load applications would be resident in the apparatus 20, since the connection between the optional airborne server is Ethernet only, while the current airplane communication interfaces to the existing manual switch are ARINC 429. A protocol 'packing' and 'unpacking' scheme would not be required if the 615-3 application is resident in the apparatus.

If an optional server is not installed on an aircraft that utilizes a 'smart' switch, the avionics routing functionality of the switch may still be enabled and remotely controlled if an Ethernet connection 26 is established directly to a wireless spread spectrum transceiver located on-board the aircraft as referenced in FIG. 2. Installation of additional network cards would allow future ARINC 615A Ethernet systems 410 in FIG. 4 to utilize the routing and data loading capability of the apparatus 400. The 'smart' switch coupled with a standard network device such as a multi-input hub or switch 411, allows the addition of new ARINC 615A systems to be easily scalable.

Figure 3:
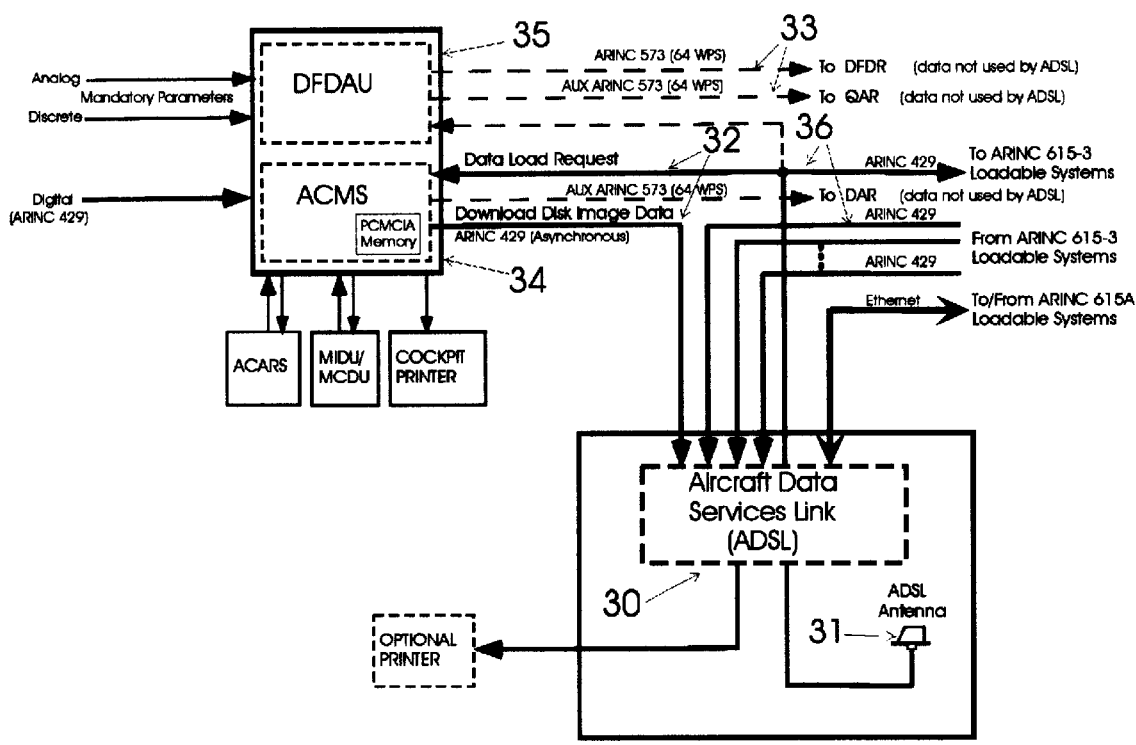
FIG. 3 diagrammatically illustrates the invention in the context of a remotely controlled data query and acquisition tool using interactive ARINC 429 communication protocol. It is a key element of the Aircraft Data Services Link (ADSL) for obtaining stored data download disk image data from any LRU connected to the invention, including FMCs, CMCs, ACMS, etc.
Figure 4:
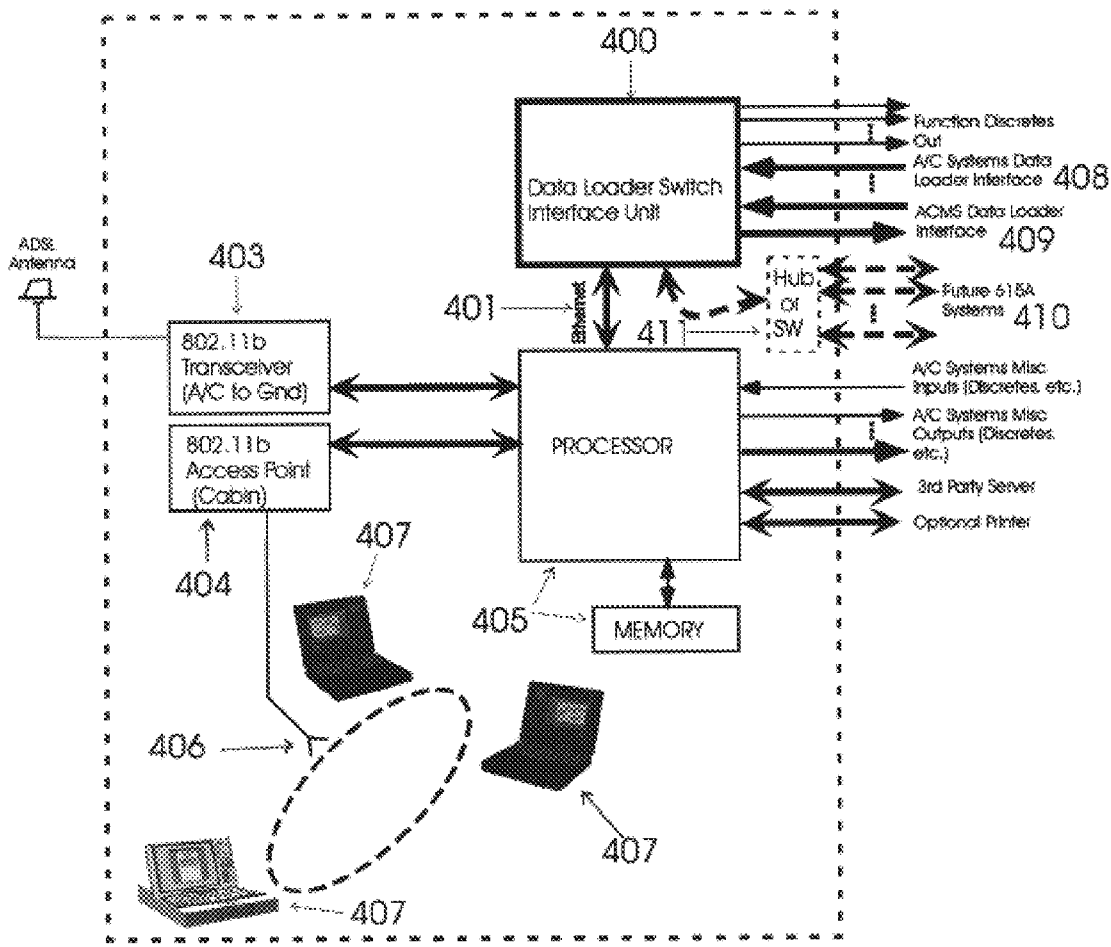
FIG. 4 diagrammatically illustrates the 'novelty' of the ADSL for wirelessly communicating with a ground station, utilizing the capabilities of the switch interface unit to seamlessly acquire data from all LRUs to which it is connected without manual on-aircraft intervention.

The second application has the 'smart' switch as part of a provisional Network Server System such as the Aircraft Data Services Link (ADSL) 30 shown in FIG. 3. As an integral part of the ADSL the apparatus 400 can be:

1) controlled remotely through the provisional Ethernet connection that is only activated in this integrated mode by way of stored directed commands from an optional airborne server, as depicted in FIG. 4 by the processor and memory 405.
2) controlled remotely through the provisional Ethernet connection 401 that is only activated in this integrated mode by way of directed commands from a ground-based network operations center or cabin terminal devices 407 via 802.11b spread spectrum wireless connections, consisting of an ADSL antenna 402, internal cabin antenna 406 and on-aircraft external 403 and internal 404 cabin communication transceivers as shown in FIG. 4.
3) queried remotely from any network device for stored LRU configuration information, i.e., software part numbers from any or all of the avionics systems connected to the apparatus.
4) requested to or automatically perform compatibility checks between 'expected' software part numbers stored in a database resident in the apparatus or a ground based system or external airborne server connected to the apparatus, and 'actual' part numbers collected by the apparatus. Failure of a compatibility or aircraft configuration check may allow triggering of an automatic upload of the improperly configured LRU with the correct software update, with the verification results presented to a qualified remote operator for 'electronic signoff'. This could eliminate the need for paperwork and visual inspection of an aircraft display—CDU, EFIS, HUD combiner, etc. to be viewed and verified by Quality Assurance personnel only at the aircraft. An automatically generated report or work order accomplishment report may be verified at any remote network client device connected to the aircraft LAN.

It should be emphasized that in all of the above mentioned functionality, any network device connected to the aircraft LAN or ground based WAN (with adequate operator permissions), is capable of remotely initiating ARINC 615 uploads and downloads to and from all of the ARINC 615 compatible Avionics LRUs 408 409 410 without manual on-aircraft intervention via the apparatus 400 functioning as an avionics gateway. This method of data acquisition of flight performance and maintenance data and software uploading to airborne computers is a marked improvement over existing inventions.

The flight performance data can be acquired and transmitted wirelessly to a ground-based system using the ARINC 615-3 data loader interface 409 to the Aircraft Condition Monitoring System (ACMS) computer 34. This is a distinctly different data acquisition method 32 than ones suggested in previous inventions. Remote network operator or automatically generated 615 download requests initiate (upon or anytime after landing) the acquiring of A615-3 download disk image data representing the flight performance data stored during flight in the ACMS computer 34. Prior inventions' embodiments suggest acquisition and storage of a real-time serial stream output 33 from the Digital Flight Data Acquisition Unit (DFDAU) 35 using the airborne processor and memory portion of a network server system. The flight performance data is subsequently transmitted to a ground station upon landing.

The proposed new method and apparatus enables the remote and/or automated acquisition of fault and maintenance data 36 stored within the airborne computers using the ARINC 615-3 data download protocol.

That which is claimed is:

1. A method to route and remotely upload software updates to ARINC 615 compliant LRUs on an aircraft which comprises:

Connecting all avionics computers that accept ARINC 615 operational program software, operational program configuration files and performance databases to an electronic apparatus which provides a means to complete an electrical connection between said apparatus and any loadable target on-aircraft computer for the purpose of uploading software files remotely or by means of commands stored in said apparatus;

Initiating a software upload, software upload request or configuration request to the electrical apparatus from an on-board or ground-based network client, said apparatus in the form of a server/router/switch with display capability, installed in the flight deck compartment of an aircraft;

Converting received ARINC 615 communication from a loadable target computer as a result of a software upload, to any number of standard network-based protocols for storage of pertinent feedback information and further transmission to requesting network clients, this information comprising of:

Updated software part number or part numbers generated and transmitted by the target LRU or LRUs to the apparatus upon successful completion of a software upload and collected and stored in the electrical apparatus, whereby the software upload, software upload request or configuration request is initiated by network devices including:

a) remote client devices operatively connected to the aircraft LAN using wired Ethernet, fiber-optic connectivity or a cabin or aircraft wireless spread spectrum connection configured as an wireless access point, b) remote client devices operatively connected to the airport WAN, typically located in an appropriate ground-based network operations center, which provides data content for subscribing aircraft.

2. A method according to claim 1, and further comprising the polling of all aircraft computers connected to the apparatus, wherein the most recent configuration information in the form of software part numbers is collected and stored by said apparatus.

3. A method according to claim 1, and further comprising the automatic configuration and compatibility checking of installed software loads on an individual aircraft basis, wherein the results of those checks are generated into reports, including a formatted quality assurance, maintenance operations or service provider's electronic report and transmitted across networks to be stored and delivered to selected network components with routable IP addresses.

4. A method according to claim 1, and further comprising the accessing of a repository of a software upload intended for a specific aircraft LRU to include any available WAN node operatively connected to the aircraft LAN, wherein a verifiable copy which passes all on-aircraft compatibility checks is accessible and routable to the target LRU by way of the apparatus.

5. A method according to claim 1, and further comprising the converting of ARINC 615 handshaking data words received by the apparatus from the target LRU to any number of network protocols, wherein the data loader application is not resident on the apparatus, but in another aircraft LAN component operatively connected to said apparatus.

6. A method to initiate and route an ARINC 615 download of software information from the ARINC 615 compliant LRUs on an aircraft which comprises:

Capturing operational and maintenance data generated and stored in individual LRUs, utilizing ARINC 615 data download commands transmitted from the apparatus and initiated from any authorized network client, said data including:

a) triggered flight performance reports and raw parametric flight data stream stored in the ACMS, b) any other stored LRU information contained in aircraft LRUs, including internal and interface faults, maintenance operations data and digital audio and video files stored or contained on network-enabled LRUs.

7. A method according to claim 6, and further comprising the ARINC 615-3 data querying and transferring of ACMS FOQA reports to an on-aircraft storage location resident on any network addressable device and subsequent automatic transmission to a wireless ground-based node upon landing and when a connection is established with any ground-based WAN, said WAN operatively connected to the aircraft LAN using a airport wireless spread spectrum link.

8. A method according to claim 6, and further comprising the manipulation and reduction of the raw fault data and subsequent report generation within the apparatus or any other downstream network component, including an on-board network server, ground-based server associated with a network operations center or any number of wireless and wired remote clients connected to the ground-based WAN, said WAN operatively connected to the aircraft LAN using a airport wireless spread spectrum link.

9. A method according to claim 6, and further comprising the automatic routing of collected LRU data based on customer modifiable triggering criteria or upon the apparatus or optional network server receiving a request initiated by a remote network client.

10. A method according to claim 6, and further comprising the ARINC 615A data querying, transferring and routing of data from ARINC 615A loadable systems, said systems establishing communication with the apparatus through a network Ethernet hub or switch.

11. An apparatus for manually and remotely activating ARINC 615 communication with connected aircraft computers comprising of:

A software programmable electronic switch used to select a target aircraft LRU for ARINC 615-3 data uploads and downloads, said switch having:

a) A processor controlled switch interface directly connected to all loadable ARINC 615-3 LRUs, b) TCP/IP network connectivity to a Network Server System file server or spread spectrum wireless transceiver, c) Programmable I/O so that various configurations of aircraft data loader connections can be mapped at the unit and available for display or transmission to any authorized network client, d) ARINC 429 transceivers used for data bus monitoring and transmission, e) A display and programmable selection buttons to initiate actions determined by software resident on said electronic switch, including using the front panel buttons for manual control of the connections to the said switch, manual acquisition and routing of data contained in aircraft LRUs connected to said switch and enabling of a video feed from network devices, including network cameras operatively connected to the apparatus for viewing on the apparatus display, f) A configuration data collection tool, used for polling the aircraft LRUs for software part numbers, storage, and transmission of reports containing software part number related information to requesting network clients.

12. An apparatus according to claim 11, and further comprising the capability to remotely control all of the functionality of said switch from any authorized network client, including those connected to an aircraft LAN or any ground-based WAN operatively connected to said aircraft LAN using an airport wireless spread spectrum link to said aircraft.

13. An apparatus according to claim 11, and further comprising a switch connection function resident in said apparatus, which utilizes a directed command from the requesting network client in combination with the monitoring of the system address label (SAL) contained in the A615 header file to remotely connect the appropriate target LRU interfaces for data loading, wherein the desired task is either a software upload or download.

14. An apparatus according to claim 11, and further comprising an embedded ARINC 615 data loader function, capable of being controlled remotely from any authorized network client.

15. An apparatus according to claim 11, and further comprising a connection to all ARINC 615A LRUs through an Ethernet Hub or Switch.

16. An apparatus according to claim 11, and further comprising device memory storage, both dynamic and flash memory.

17. An apparatus according to claim 11, and further comprising embedded report generation software and operational configuration files, whereby a plurality of reports are generated for routing and transmission across the aircraft and ground networks, said reports including stored ACMS FOQA files, raw or consolidated LRU fault information, recorded digital video and audio files and other maintenance and configuration information available from aircraft LRUs operatively connected to said apparatus.

18. An apparatus according to claim 11, and further comprising of embedded software resident on the apparatus that provides a fault consolidation and correlation function, whereby the output of this function may be automatically routed and transmitted across the aircraft and ground networks or be controlled remotely from any authorized network client.

* * * * *